United States Patent [19]
Ade et al.

[11] Patent Number: 5,194,769
[45] Date of Patent: Mar. 16, 1993

[54] ELECTRIC MOTOR, IN PARTICULAR ELECTRIC SMALL-SIZE MOTOR FOR DRIVING WINDSHIELD WIPERS ON MOTOR VEHICLES

[75] Inventors: Rolf Ade, Bietigheim-Bissingen; Harro Buhl, Kirchheim; Theodor Schneider, Freudental, all of Fed. Rep. of Germany

[73] Assignee: SWF Auto-Electric GmbH, Fed. Rep. of Germany

[21] Appl. No.: 688,933

[22] PCT Filed: Jan. 9, 1990

[86] PCT No.: PCT/EP90/01467
§ 371 Date: May 28, 1991
§ 102(e) Date: May 28, 1991

[87] PCT Pub. No.: WO91/03856
PCT Pub. Date: Mar. 21, 1991

[30] Foreign Application Priority Data

Sep. 9, 1989 [DE] Fed. Rep. of Germany ....... 3930144

[51] Int. Cl.⁵ .................... H02K 5/10; H02K 11/00
[52] U.S. Cl. .................... 310/51; 310/67 R; 310/89
[58] Field of Search .............. 310/51, 83, 89, 67 R; 15/250 R, 250.12, 250.13

[56] References Cited

U.S. PATENT DOCUMENTS 2,464,847 3/1949 Coffey .................... 318/468
4,857,812 8/1989 Mochizuki et al. ............ 318/15
5,063,317 11/1991 Bruhn .................... 310/91

FOREIGN PATENT DOCUMENTS 3542632 6/1986 European Pat. Off. .
0252481 1/1988 European Pat. Off. .
2046997 11/1980 United Kingdom .

Primary Examiner—Steven L. Stephan
Assistant Examiner—Judson H. Jones
Attorney, Agent, or Firm—Robert P. Seitter; J. Gordon Lewis

[57] ABSTRACT

An electric motor, in particular an electric small-size motor for driving windshield wipers on motor vehicles including a cup-shaped motor housing, a gear housing closing one front side of the motor housing by an end shield and having a cup-shaped section for receiving gearing elements and a cover closing the cup-shaped section of the gear housing, a holding device for an electric component positioned in a pocket of the cup-shaped section of the gear housing, in particular a holding device for at least one noise suppressor as coil, capacitor or diode, which electric component is connected in an electrically conductive way with a carbon brush arranged in the motor housing. The motor's impermeability is improved holding device being located in a pocket of the interior of the cup-shaped section of the gear housing, the pocket is closed by the cover, a passage closed towards the outside is conducted from the pocket through the end shield into the motor housing and the component is connected with the carbon brush through the passage.

25 Claims, 7 Drawing Sheets

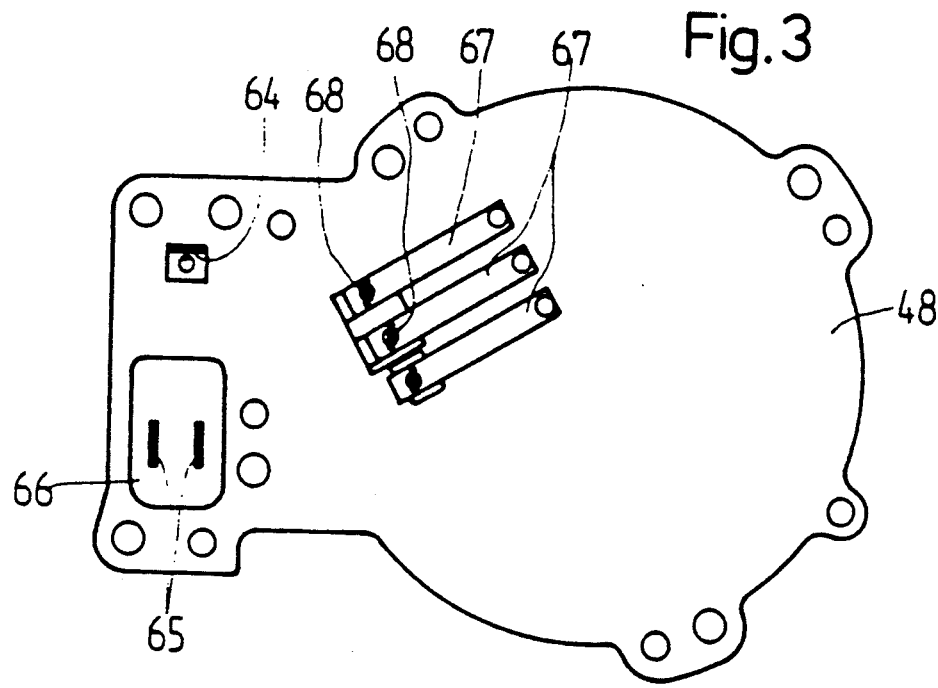
Fig. 3
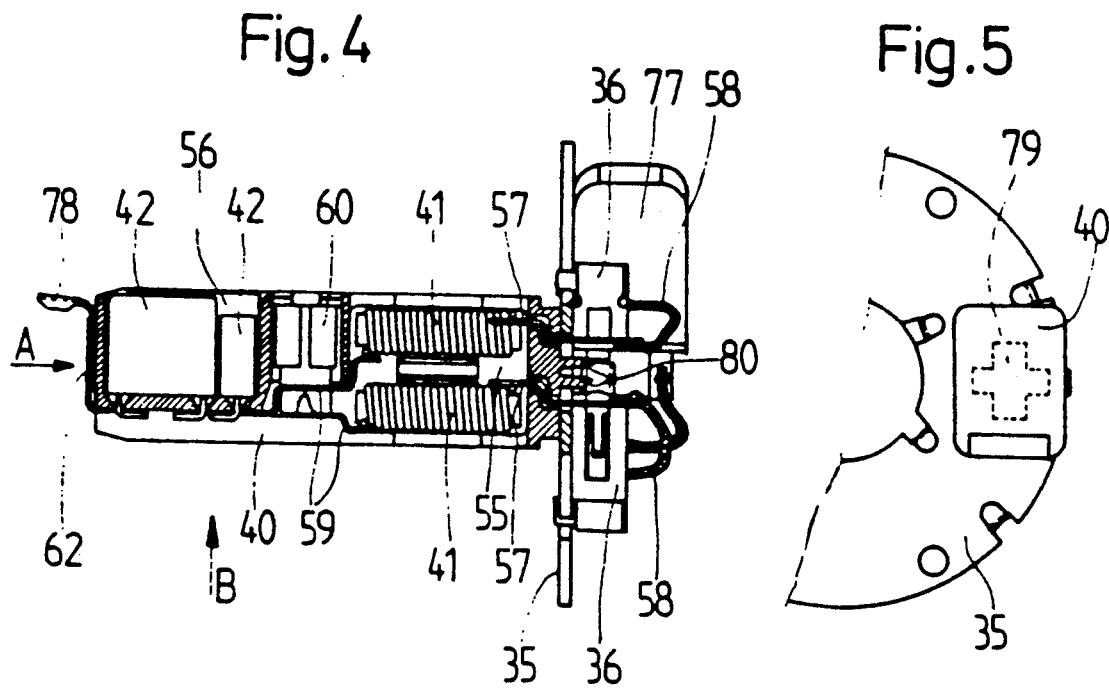
Fig. 4
Fig. 5

ELECTRIC MOTOR, IN PARTICULAR ELECTRIC SMALL-SIZE MOTOR FOR DRIVING WINDSHIELD WIPERS ON MOTOR VEHICLES

INTRODUCTION

This invention relates to an electric motor, in particular to an electric small-size motor for driving windshield wipers on motor vehicles.

BACKGROUND OF THE INVENTION

Electric small-size motors are known in which a brush holder plate arranged in the motor housing also carries noise suppressors as coil or capacitor. As far as a planar brush holder plate of a hard paper is concerned the noise suppressors are freely turned up, so that they have to be adjusted when mounted and inspite of that an exactly defined position of the noise suppressors cannot be ensured. Accordingly the noise suppressing conditions differ slightly from motor to motor. Furthermore the noise suppressors on the brush holder plate are subjected to heavy shocks.

Electric small-size motors with brush holder plates made of plastic material have been available which have recesses for noise suppressors, so that the latter can be well fixed and always occupy the same position. However the noise suppressors continue to be exposed to the shocks caused by the carbon brushes. The high temperatures within the motor housing coming into existence above all in the case of blocking also act upon the noise suppressors. It has to be added that in electric small-size motors for driving windshield wipers on motor vehicles in addition to mostly three carbon brushes and the noise suppressors at least one thermal switch has to be accommodated within the motor housing.

Therefore people also had the idea not to accommodate noise suppressors, which include one or more diodes for reducing voltage peaks when the motorist switched off, on the brush holder plate, but on a separate holding device, which is substantially located outside the motor and/or gear housings. So it is for example known from the German laid open patent 3,542,632 to insert a holding device with noise suppressors in a pocket of the cup-shaped section of the gear housing, which pocket is located at the outside of the said cup-shaped section and which is open in a direction extending in parallel to the cover. In the end shield of the gear housing there is an open recess in the radial direction connecting the inside of the motor housing with the pocket on the cup-shaped section of the gear housing and through which the holding device grips into the motor housing. As far as the electric motor known from the German laid open patent 3,542,632 is concerned it is very difficult to make the motor housing impervious in the area of the holding device. The noise suppressors are also heavily exposed to outside influences.

BRIEF DESCRIPTION OF THE INVENTION

The invention is therefore based on the problem of developing an electric motor of the initially mentioned kind in such a way that with a maintenance of an automation-suitable construction the impermeability is improved.

This problem is solved according to the invention by an electric motor in which the holding device is positioned in a pocket in the interior of the cup-shaped section of the gear housing, the pocket is closed by the cover, a passage closed towards the outside is conducted from the pocket through the end shield into the motor housing and the device is connected with the carbon brush through the passage. Thus in a motor of this kind the end shield has no passage open towards the outside and which is only incompletely closed by the holding device. There are only those apertures necessary in the gear housing, in particular in the gear housing cover, through which the electric components in the holding device as well as the electric contacts of a possibly available limit switch are connected with an outside electric network, for example with the motor vehicle wiring.

As an electric component (or electric components) the holding device can also comprise one or more metal conductors which, within the gear housing and through the end shield, effect an electric connection between the terminals of the electric motor held on the gear housing and the carbon brushes in the motor housing. A metal conductor of this kind can for example be a sheet metal strip. Such an electric motor can also be sealed more easily than a motor in which cables or metal conductors are conducted into the motor housing through passages of the end shield or of the motor housing open towards the outside, although the passages are filled with plastic material or rubber.

Advantageous embodiments of an electric motor according to the invention can be seen from the subclaims.

In particular electric motors for driving windshield wipers on motor vehicles mostly have a worm in the cup-shaped gear housing section and a worm wheel mating with this worm. It proved to be favorable, if the pocket for the holding device, looked at from the worm wheel, is positioned beyond the worm.

The gearing elements in the gear housing are normally greased and subject to a certain wear. In order to prevent the electric components in the holding device from being dirtied the pocket for the holding device of an electric motor of a preferred embodiment according to the invention is closed towards other parts of the cup-shaped section, especially towards the parts including the gearing elements.

A good sealing between cover and cup-shaped gear housing section is achieved in all cases in which the cover rests upon a rim of the cup-shaped gear housing section. Therefore according to claim 6 the supporting rim of the cup-shaped gear housing section is continued in the vicinity of the passage alongside the end shield.

In order to prevent the electric connections between the components on the holding device and the electric components on a brush holder plate in the motor housing, thus in particular the carbon brushes on the brush holder plate, from being mechanically strained too heavily, it is favorable, if the holding device and the brush holder plate are fixed on each other through the passage. Advantageously the holding device extends through the passage as far as to the brush holder plate, so that a usual planar brush holder plate made of a hard paper can be used.

Advantageously the holding device may be pushed through the passage of the end shield into the pocket of the gear housing. In a development of this kind the holding device can be regarded as a structural unit which like the tubular brush-holders for the carbon brushes, the carbon brushes themselves, pressure springs or thermal switches is at first mounted on the brush holder plate. The entire premounted unit is thereafter put onto the end shield, the holding device thereby dipping through the end shield and then reaching the pocket of the gear housing. In contrast to the designs known until now in which all components mounted on the brush holder plate are positioned in the motor housing, thus one component occupies a space in the gear housing. A solution of this kind deems also to be advantageous for such components which, like thermal switches, do not need an additional holding device, but can project into the gear housing directly from the brush holder plate through a passage in the end shield.

The passage in the end shield can with its cross-section not exceed a certain measurement, so that also the size of the holding device is limited, if it is to be pushed through the passage into the pocket of the gear housing. It can therefore be advantageous that the holding device is capable of being inserted into the pocket of the cup-shaped gear housing section from a side to be closed by the cover. Then its cross-section can be larger than the cross-section of the passage through the end shield. In a case like this one it is favorable to fix the holding device on the cover, so that, during the final assembly of the motor, cover and holding device can be mounted as a single structural unit.

The electric components on or in the holding device have to be connected in an electrically conductive manner with electric components within the motor housing and with outside terminals of the electric motor. It is therefore advantageous, if the holding device has at least one plug for this purpose, which co-operates with a corresponding counterplug. In particular such a design is favorable, if a counterplug is fitted on the cover.

Above all, if the holding device can be inserted into the pocket of the cup-shaped section of the gear housing from the side to be closed by the cover it may be advantageous if an intermediary is positioned in the passage of the end shield between holding device and a brush holder plate arranged in the motor housing, on which intermediary electric leads are fitted. Then the electric connection between holding device and intermediary may advantageously be effected by plug and counterplug.

The noise suppressor parts themselves as well as noise suppressors and carbon brushes are suitably connected in an electrically conductive way via sheet metal strips. These sheet metal strips can be firmly inserted in the holding device and are relatively solid, so that the connecting wires of the noise suppressor parts can be easily fixed on them. In addition they can in sections simultaneously be formed as a plug or counterplug.

A noise suppressor can be easily connected with the gear housing in an electrically conductive way via a sheet metal strip fitted on the holding device, said sheet metal strip thereby pinched between cover and cup-shaped gear housing section. In order to prevent certain outside measurements of the holding device from being exceeded and enabling the holding device to be pushed into the pocket of the gear housing through the end shield, it is of advantage, if the sheet metal strip with its portion pinched between cover and cup-shaped gear housing section is positioned at a lower level than the supporting rim on the cup-shaped gear housing section for the cover. Therefore the cup-shaped gear housing section is provided with a hollow in which the said portion of the sheet metal is positioned. In order to be pinched between cover and cup-shaped gear housing section a lug is cut from the cover which presses onto the sheet metal. The hole in the cover created by the lug is advantageously injection-moulded with plastic material.

For arranging the noise suppressors on the holding device it is deemed favorable if the holding device comprises a first chamber with one or more noise suppressing coils and a second chamber for one or more capacitors. In order to give the holding device a slim shape the chambers, looked at in a direction perpendicular to the end shield, are positioned one behind the other. For an effective noise suppression the noise suppressors are in a particular way interconnected themselves, with the carbon brushes and with the outside terminals of the electric motor. In order to effect electric connections in a simple way the chamber for a capacitor is suitably located farther from the end shield than the chamber for a noise suppressing coil. Plugs provided on the holding device are preferably positioned between the two chambers.

Embodiments of an electric motor according to the invention are shown in the accompanying drawings. The invention will be described in detail by way of the Figures of these drawings[, in which:].

BRIEF DESCRIPTION OF THE DRAWINGS

FIG. 3, is an interior view of the cover for the cup-shaped gear housing section of FIGS. 1 and 2;

FIG. 4, is a premounted structural unit consisting of a brush holder plate bearing components and of a holding device provided with noise suppressors, wherein there are small constructive differences with regard to the brush holder plate and the holding device from FIGS. 1 and 2;

FIG. 5, is a partial view onto holding device and brush holder plate in the direction of arrow A of FIG. 4, whereby the parts mounted on the holding device of FIG. 4 have been omitted;

DETAILED DESCRIPTION OF THE PREFERRED EMBODIMENTS OF THE INVENTION

Figure 1:
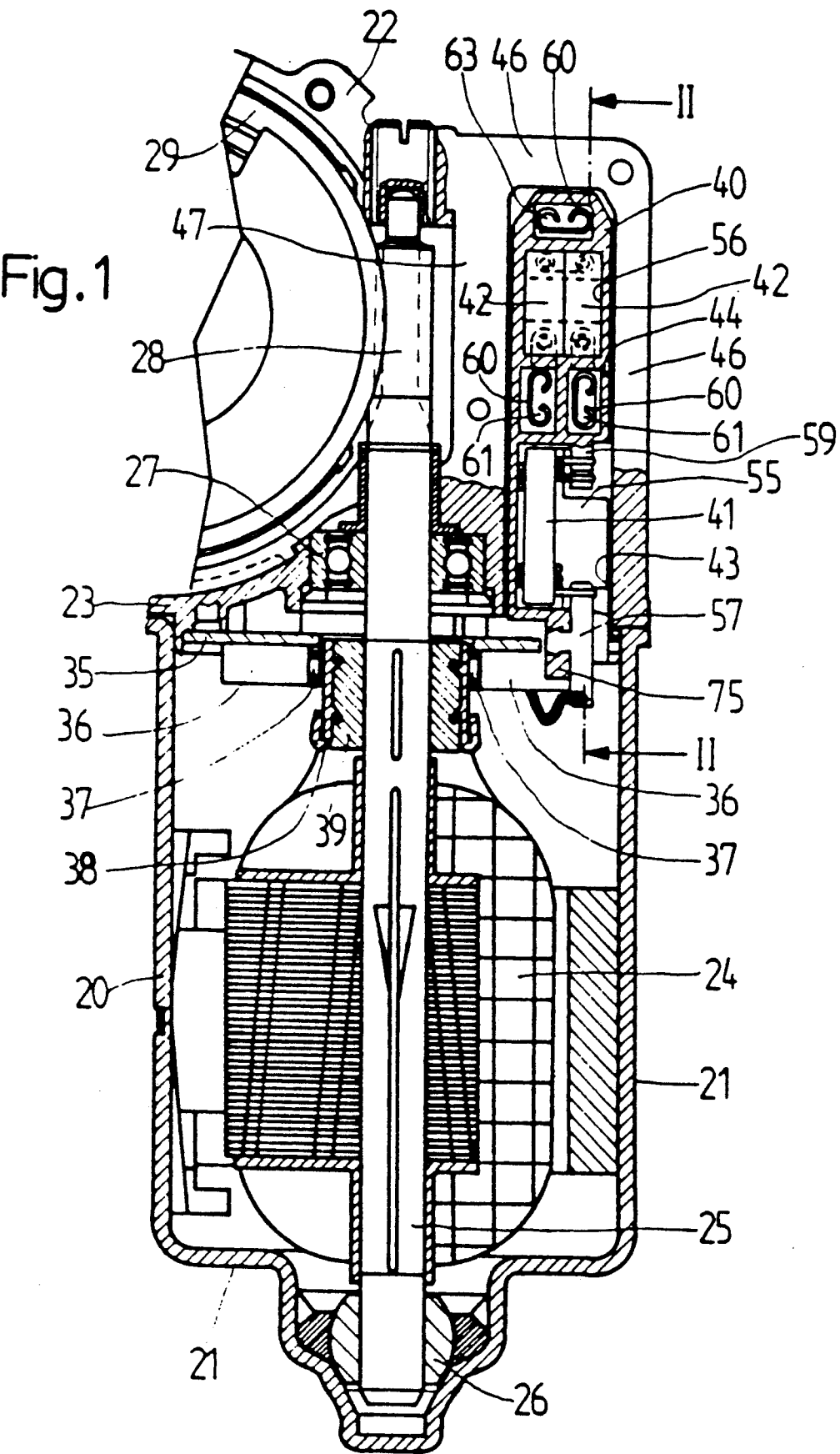
FIG. 1, is a first embodiment partially as a sectional view, partially in a view onto the open gear housing.
Figure 2:
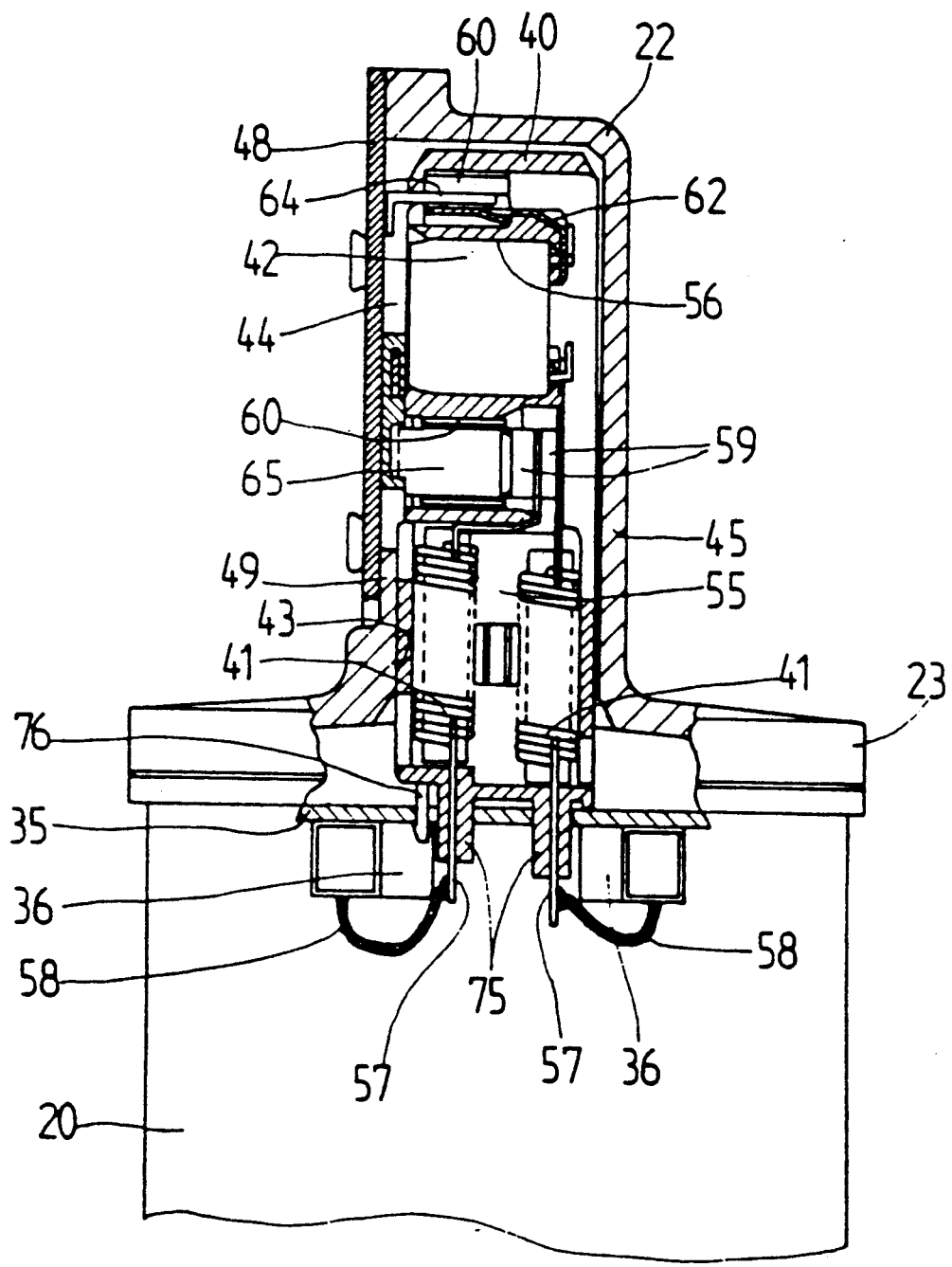
FIG. 2, is a section taken on the line II-II of FIG. 1.

The windshield wiper motor of FIGS. 1 and 2 has a deep-drawn cup-shaped motor housing 20 with a bottom 21. Onto the open side of the motor housing a gear housing 22 with an end shield 23 is flanged. An armature 24 of the motor is with its shaft 25 rotatably mounted in a ball-shaped bearing 26 at the bottom 21 and a ball-bearing 27 at the inner side of the end shield 23 facing the motor housing. The armature shaft 25 projects through an aperture in the end shield 23 into the gear housing 22 and is there formed as a worm 28 mating with a worm wheel 29 mounted in the gear housing 22. At the inner side of the end shield 23 a completely planar brush holder plate 35 is fastened, which stands perpendicularly on the armature shaft 25 and at its side not facing the end shield 23 bears three metal tubular brush-holders 36, of which two can be seen in FIGS. 1 and 2. In the tubular brush-holders 36 carbon brushes 37 are positioned which rest against laminations 38 of a commutator 39.

From the side of the end shield 23 facing the brush holder plate 35 a holding device 40 extends perpendicularly upwards, in which two noise-suppressing coils 41 and two noise-suppressing capacitors 42 are inserted. The holding device 40 penetrates a passage 43 of the end shield 23, which passage is closed towards the outside and is located in a pocket 44 of the cup-shaped section 22 of the gear housing, which latter, looked at from the worm wheel 29, is positioned beyond the worm. The pocket 44 is closed towards the outside by a bottom 45 and side walls 46 of the cup-shaped gear housing section 22. The pocket 44 is separated from the areas of the cup-shaped gear housing section by an intermediary wall 47 which extends in parallel to the worm 28 and which is just as high as the side walls 46 of the cup-shaped gear housing section 22. The upper edges of the side walls 46 and of the intermediary wall 47 of the cup-shaped section 22 of the gear housing serve as supporting surfaces for a cover 48, which is punched out from a planar sheet metal and closes the cup-shaped section 22 of the gear housing as well as the pocket 44. Also in the area of the passage 43 the supporting rim for the cover 48 is conducted alongside the end shield by means of a portion 49, so that the cover 48 can seal the pocket 44 around its circumference.

The holding device 40 has a first chamber 55, in which the noise-suppressing coils 41 are located and a second chamber 56 with the two noise-suppressing capacitors 42. Looked at in a direction perpendicularly to the end shield 23 the two chambers 55 and 56 are positioned one behind the other, whereby the chamber 55 for the noise-suppressing coils is closer to the brush holder plate 35 and thus also to the end shield 23 than the chamber 56 of the noise-suppressing capacitors 42. It deemed to be advantageous in view of the available cross-section of the holding device 40 to place the coils 41 in a first direction and the capacitors 42 in a second direction perpendicular to the first direction beside each other. Consequently the two chambers 55 and 56 are also open towards different directions.

Each coil 41 is on its one side connected with a sheet metal strip 57, which is conducted through a wall limiting the chamber 55 towards the brush holder plate 35 and through the brush holder plate 35. A litz flexible conductor 58 is welded onto each sheet metal strip 57. At the other side each coil is connected e.g. by welding with one of two sheet metal strips 59, of which one leads to a terminal of one capacitor and the other to a terminal of the other capacitor. Each sheet metal strip 59 is furthermore formed in one piece with a receptacle 60 by a punching-bending process. The two receptecles extend perpendicularly to the cover 48 and are inserted in two chambers 61 of the holding device 40, which chambers are smaller than the chambers 55 and 56 and are positioned between the latter.

Both capacitors 42 are in addition to the sheet metal strips 59 jointly connected to another sheet metal strip 62, which is also formed as a single piece with a receptacle 60 positioned in a chamber 63 at the end of the holding device 40 not facing the brush holder plate and is also directed perpendicularly to the cover 48. In the receptable 60 of the metal sheet 62 is put a plug 64 which is directly welded onto the metal cover 48. Two other plugs 65 penetrate a plastic member 66 injection-moulded onto the cover in an electrically insulated way and are positioned in the receptacles 60 of the sheet metal strips 59. At the outside of the cover a cable not shown in detail can be connected with the two plugs 65. The cover itself is connected to ground. In FIG. 3 in addition three sliding springs 67 can be recognized which are part of a limit switch of the motor. One of the sliding springs is directly welded onto the cover, while the two others are braced with plugs 68 conducted through the cover in an electrically insulated way, to which plugs cables can be connected outside on the cover.

The holding device 40 is inserted in the brush holder plate 35 by two pins 75, in which the sheet metal strips 57 are also conducted. Furthermore the holding device 40 grips behind the brush holder plate 35 with a lockingleg 76. Altogether is thereby achieved a good mechanical two parts form a premounted structural unit when assembled. In the final assembly of the electric motor this structural unit is put onto the motor in a direction perpendicularly to the end shield 23, whereby the holding device 40 is pushed through the passage 43 and reaches the pocket 44 of the cup-shaped section 22 of the gear housing. The cup-shaped section 22 is closed by putting the cover 48 onto it thereby pressing the plugs 64 and 65 into the receptacles 60.

Figure 6:
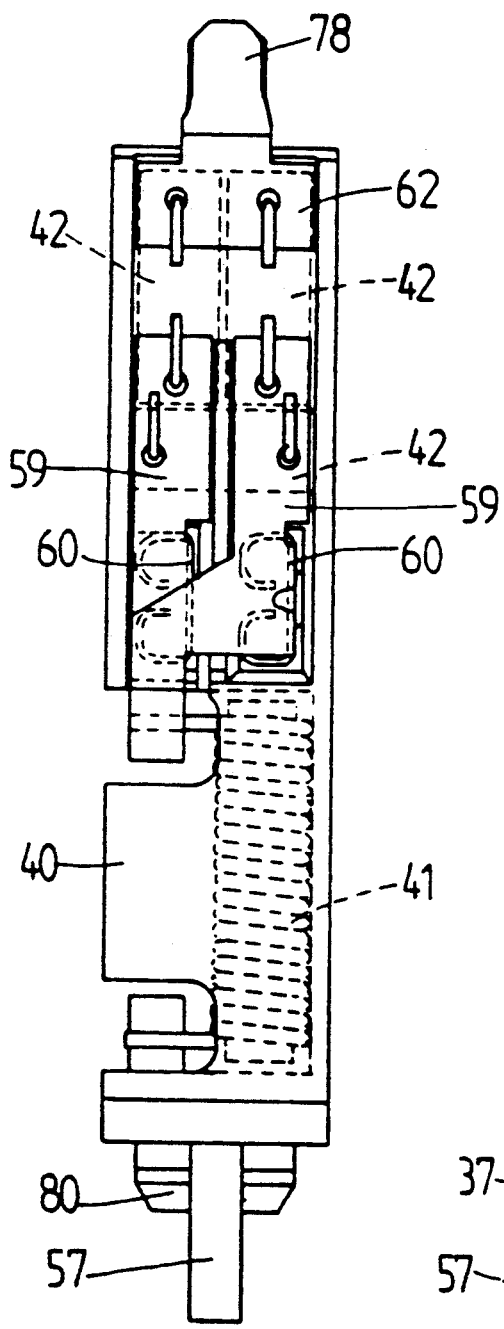
FIG. 6, is a view on the holding device in the direction of arrow B of FIG. 4

The structural unit shown in FIGS. 4 and 5 consisting of a brush holder plate 35 and a holding device 40 and the holding device alone shown in FIG. 6 are similarly constructed as the embodiment according to FIGS. 1 and 2. One recognizes on one side of the brush holder plate two of three tubular brush holders 36 for carbon brushes and in addition a thermal switch 77. The holding device comprises in a first chamber 55 again two noise-suppressing coils 41, of which each one is connected with a litz 58 in an electrically conductive manner via a sheet metal strip 57 which in contrast to the embodiment of FIGS. 1 and 2 freely penetrates the brush holder plate 35. In addition the two coils 41 are again connected in an electrically conductive way with capacitors 42 via two sheet metal strips 59 with receptacles 60, which capacitors are positioned in a second chamber 56 of the holding device 40. Altogether there are not only two but three capacitors 42 available of which one is looped between the two sheet metal strips 59 and each one of the two others between a sheet metal strip 59 and a common mass sheet metal strip 62. This mass sheet metal strip is not provided with a receptacle, but with a slightly curved contact portion 78 pointing away from the holding device 40. The connection of the said contact portion with the cup-shaped section of the gear housing and with the cover will be discussed later on. The shape of the sheet metal strips 59 and 62 and the connections of the capacitors can be seen more detailed from FIG. 6.

The mechanical connection between holding device 40 and brush holder plate 35 is different from that of the embodiment according to FIGS. 1 and 2. The brush holder plate 35 comprises indeed a cross-shaped aperture 79 which is in FIG. 5 shown by broken lines. Through this aperture dips the holding device 40 with two longitudinal locking legs 80 extending in parallel to each other and only separated by a small slot and grips behind the brush holder plate 35. The two sheet metal strips 57 are positioned laterally of the two locking legs 80 in the still remaining dents of the aperture 79. Due to the fact that the holding device 40 is on one side fitted on the brush holder plate 35 and grips behind the other side of the brush holder plate by means of the locking legs 80 and rests against the rim of the aperture 79, the brush holder plate and the holding device 40 are firmly connected with each other mechanically.

From FIG. 5 can particularly clearly be seen the rectangular and compact outside contour of the holding device 40.

Figure 8:
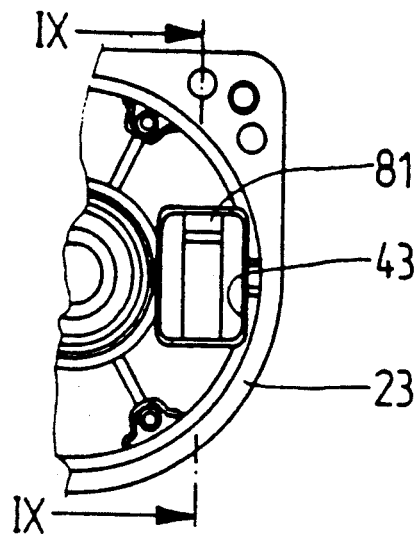
FIG. 8, is a view of the cup-shaped gear housing section of FIG. 7 in the direction to the inner side of the end shield.
Figure 9:
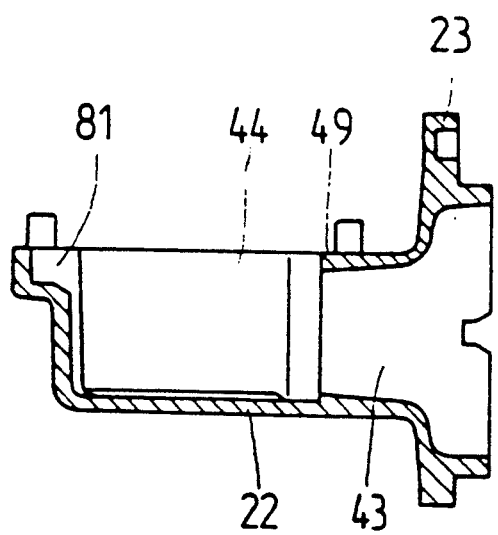
FIG. 9, is a section taken on the lines IX—IX of FIG. 7 and 8.
Figure 7:
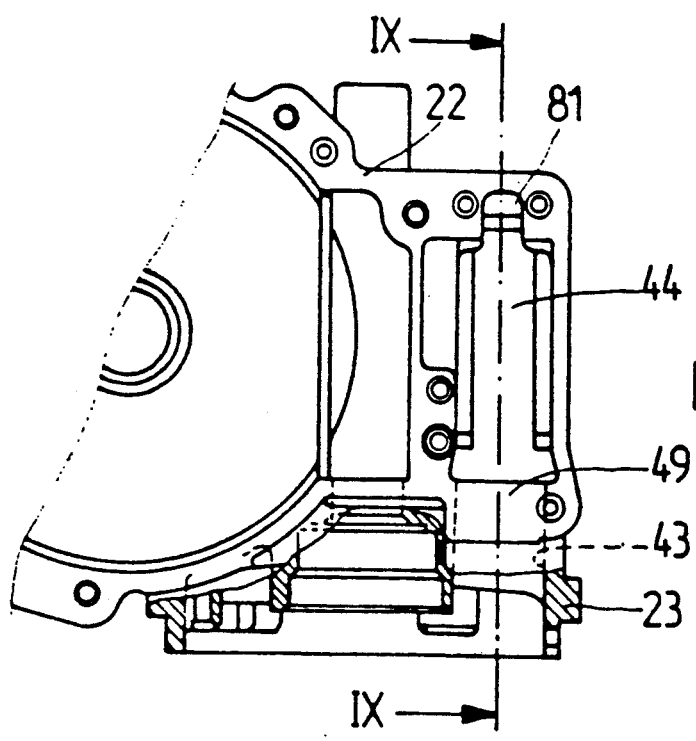
FIG. 7, is a slightly modified cup-shaped gear housing section in comparison to that of FIGS. 1 and 2, which can receive the holding device of FIGS. 4 to 6.

The cup-shaped section 22 of the gear housing including end shield 23 of FIGS. 7 to 9 is developed in such a way that it can receive a holding device 40 according to FIGS. 4 to 6. The shape of the pocket 44 and of the passage 43 becomes especially clear. So one recognizes in particular from FIGS. 7 and 9 the portion 49 of the supporting rim for a cover 48, which portion 49 is conducted alongside the end shield 23. Thereby the cover can of course be rested upon a sealing on the cup-shaped section of the gear housing. Furthermore one recognizes at that side of the pocket 44 not facing the passage 43 a deepening 81 in the cup-shaped section 22 of the gear housing, the depth of which deepening is smaller than that of the pocket 44 and which is open towards the pocket 44. Into this deepening 81 the contact portion 78 on the metal sheet 62 is put during the final assembly.

FIG. 8 shows especially clearly the shape of the cross-section of the passage 43, which tapers slightly from the inside of the end shield 23 towards the pocket 44 and to which the outside contour of the holding device 40 corresponds. It can in particular be clearly seen that the passage 43 is closed all around, especially also towards the outer rim of the end shield 23.

Figure 10:
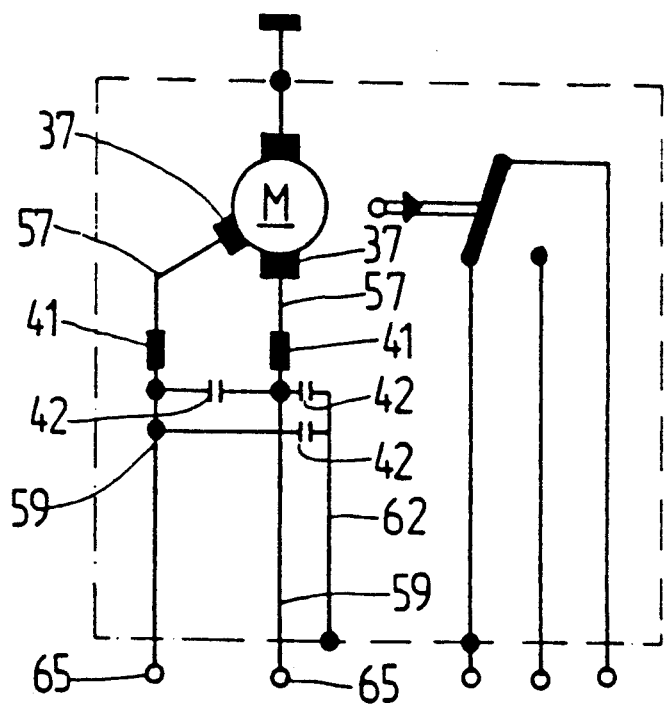
FIG. 10, is a circuit arrangement from which it can be clearly seen how the noise suppressors of the embodiment according to FIGS. 4 to 6 are themselves interconnected and also connected with the carbon brushes of a two-speed windshield wiper motor and its outside terminals.

In the circuit arrangement according to FIG. 10 the various electric components and the connections between them are designated with the same reference numerals as in FIGS. 3 to 6. Each one of two noise-suppressing coils 41 is connected with a carbon brush of the motor via a lead formed by a sheet metal strip 57. On the other hand each coil 41 is also connected with a lead formed by a sheet metal strip 59 connected with the plugs 65. A first capacitor 42 is connected with both sheet metals 59. The two other capacitors 42 are on one side also connected to a sheet metal strip 59 and at the other side they are connected to ground via a common lead formed by the sheet metal strip 62.

Figure 11:
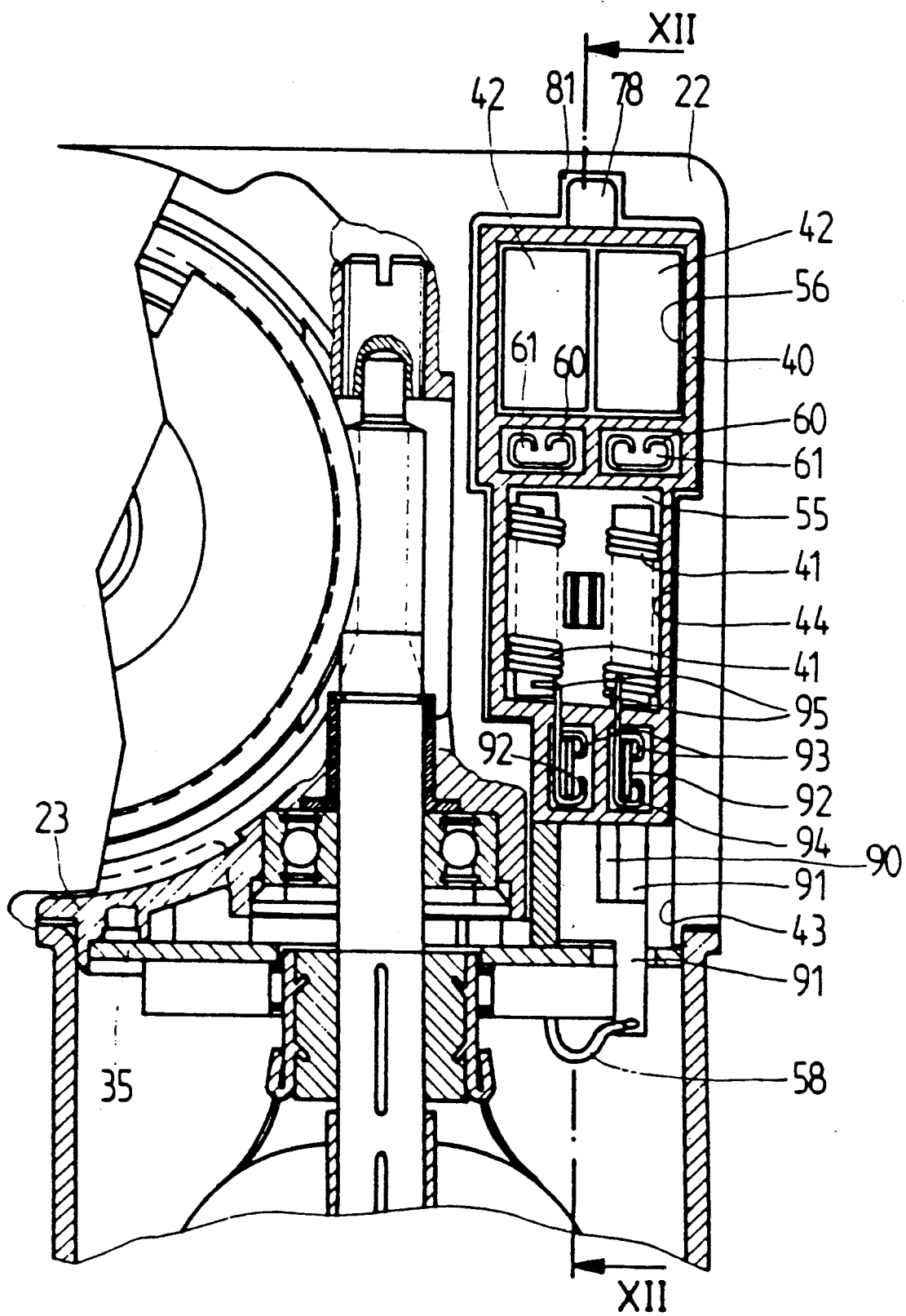
FIG. 11, is an embodiment in a view similar to that of FIG. 1, wherein the holding device for the noise suppressors may be inserted into the cup-shaped gear housing section from the side of a pocket of the latter closed by the cover.
Figure 12:
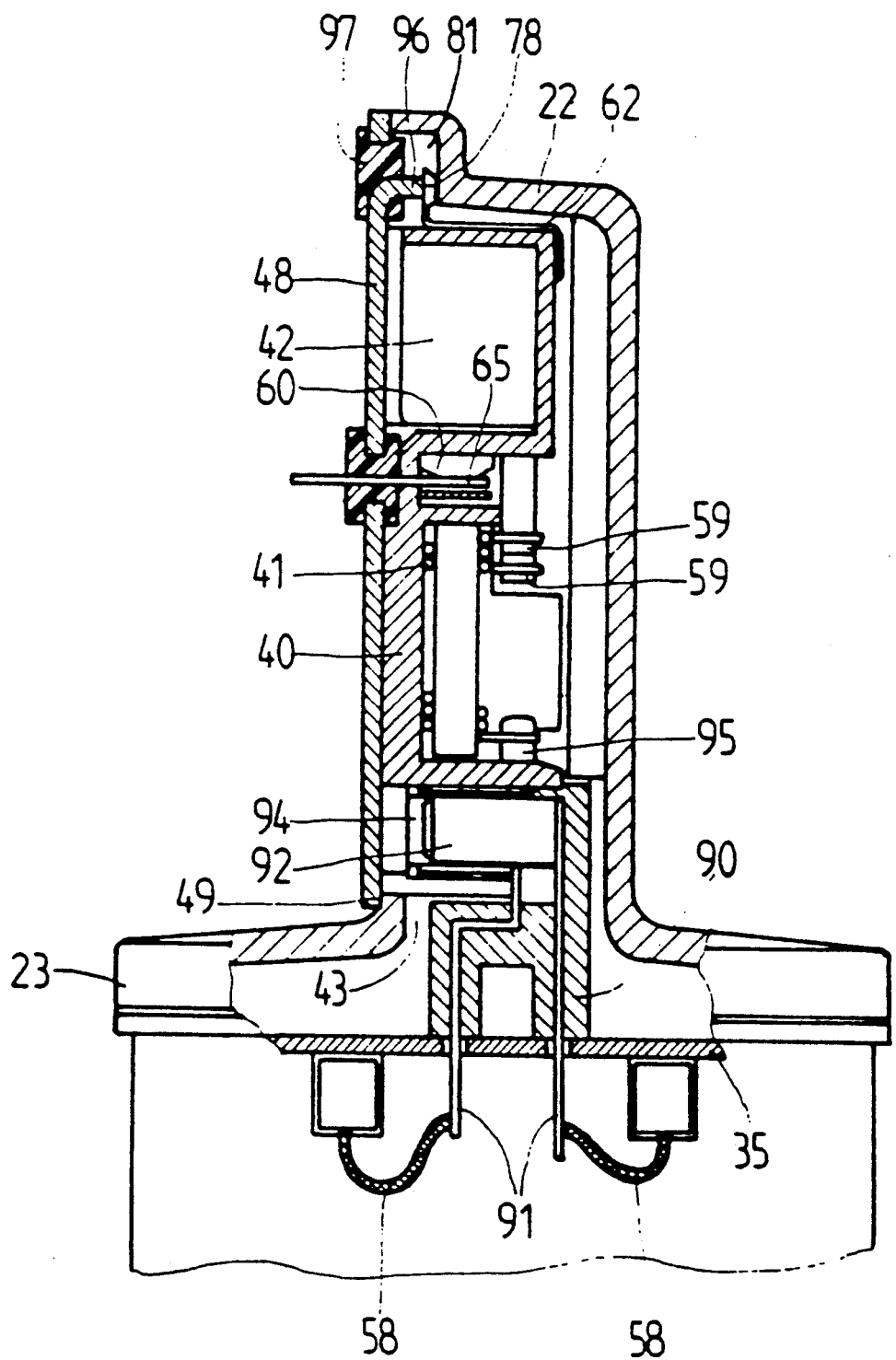
FIG. 12, is a section taken on the line XII—XII of FIG. 10.

The windshield wiper motor shown in FIGS. 11 and 12 corresponds in its construction to that of FIG. 1 and 2. The noise suppressors formed by two coils 41 and two capacitors 42 are again accommodated in two chambers 55 and 56 of a holding device 40 positioned in a pocket 44 of the cup-shaped section 22 of the gear housing. In two smaller chambers 61 between the two chambers 55 and 56 there are again positioned two receptacles 60 formed onto two sheet metal strips 59, via which the coils 41 and the capacitors 42 are connected in an electrically conductive way.

The holding device has however such a large cross-section that it cannot be pushed into the pocket 44 through the passage 43 in the end shield 23. The holding device 40 is rather inserted into the pocket 44 from the side of the cover 48. In order to enable this it has to be shorter than the holding devices 40 of FIGS. 1 and 2 or 4 to 6 respectively, because otherwise they would not be capable to pass the portion 49 of the supporting rim for the cover. In order to make the open side of the pocket 44 larger than in the embodiment according to FIGS. 1 and 2, the said portion 49 is indeed narrower than in the mentioned embodiment, however, as FIG. 12 shows, still there in so far as a supporting surface for the cover 48 is achieved. In order to be able to make the holding device 40 shorter, the two receptacles 60 are furthermore not arranged in the longitudinal direction of the holding device 40, but transversally to it.

In order to connect the two coils 41 with the litzes 58 of two carbon brushes an intermediary 90 of plastic material is fastened on the planar brush holder plate 35, which intermediary extends through the passage 43 in the end shield 23 as far as into the pocket 44. In the intermediary 90 two sheet metal strips 91 are fixed, which penetrate the brush holder plate 35 and to which, at the side of the brush holder plate 35 not facing the end shield 23, the two litzes 58 are welded. Beyond the passage 43 in the pocket 44 the two sheet metal strips 91 project perpendicularly to the cover 48 as flat-pin terminals 92. The holding device 40 comprises two receptacles 94 in two additional chambers 93 in front of the chamber 55, which receptacles are formed in one piece with two sheet metal strips 95, of which each leads from the chamber 55 into a chamber 93 and is connected in an electrically conductive way with a coil 41. In the final assembly of the motor at first the brush holder plate 35 is put onto the end shield 23, the intermediary 90 thereby dipping into the passage 43. When entering the holding device 40 into the pocket 44 the receptacles 94 are pushed onto the flat-pin terminals 92.

The holding device 40 can be already mounted on the cover 40 before it is inserted in the pocket 44, so that cover 48 and holding device 40 form a premounted structural unit. When cover 48 and holding device 40 are mounted on each other two plugs 65 conducted through the cover 48 in an insulated way are inserted into the receptacles 60. The holding device 40 can for example be mounted on the cover 48 in that it grips through holes of the cover 48 by means of rivet pins and that the said rivet pins are deformed at the upper side of the cover. However the holding device can also be clipped onto the cover 48. It can also be conceived that the holding device 40 is directly injection-moulded onto the cover.

The holding device 40 according to FIGS. 11 and 12 just as the holding device according to FIGS. 4 to 6 comprises a sheet metal strip 62 onto which the two capacitors 42 are jointly soldered and which comprises a contact portion 78 positioned in a deepening 81 of the cup-shaped section 22 of the gear housing. From the cover 48 is cut a lug 96 and perpendicularly bent into the deepening 81 of the cup-shaped section 22 of the gear housing, where it is pressed against the contact portion 78 of the sheet metal 62. The hole in the cover 48 caused by the bent lug 96 is closed by a plastic plug 97 directly injection-moulded onto the cover. A cover 48 with a lug 96 as shown in FIG. 12 is also provided for the holding device 40 of FIGS. 4 to 6 inserted into a cup-shaped section of the gear housing according to FIGS. 7 to 9.

What is claimed is:

1. An electric motor drive unit for motor vehicle windshield wipers comprising:
   a generally cup-shaped motor housing;
   a gear housing defining an end shield mating with said motor housing to define a substantially closed cavity, the end shield having no passage towards the outside, a cup-shaped section for receiving gearing elements, and a pocket opening into said closed cavity through said end shield;
   a cover closing said cup-shaped section and the pocket of said gear housing;
   a holding device for retaining at least one associated noise-suppressing electric component within said pocket, the pocket protecting the component, in circuit with motor current commuting means within said closed cavity through said pocket opening.

2. An electric motor drive unit for motor vehicle windshield wipers comprising:
   a generally cup-shaped motor housing;
   a gear housing assembly defining an end shield mating with said motor housing to define a substantially closed cavity containing commutator means and an armature including a shaft extending through said end shield and terminating within said gear housing, said gear housing assembly further defining a cup-shaped section containing gearing elements drivengly engaging said shaft and a pocket opening into said closed cavity through a passageway within said end shield;
   a holding device insulatively retaining at least one motor noise-pressing reactive electric component and associated conductors in assembly within said pocket in circuit with said commutator means through said passageway;
   a cover closing said cup-shaped section and pocket of said gear housing; and
   electrical interface means operative to interconnect said drive unit with a source of electrical current, said interface means including first connector means insulatively carried by said cover and second connector means carried by said holding device for mating engagement with said first connector means.

3. An electric motor, in particular an electric small-size motor for driving windshield wipers on motor vehicles, comprising:
   a cup-shaped motor housing;
   a gear housing closing one side of the motor housing by means of an end shield and having a cup-shaped section for receiving gearing elements;
   a cover closing the cup-shaped section of the gear housing;
   a holding device for receiving at least one associated noise-suppressing electric component, the holding device being disposed within a pocket of the cup-shaped section of the gear housing and the component being connected in an electrically conductive way with a carbon brush disposed in the motor housing, wherein a passage closed towards the outside extends from the pocket through the end shield into the motor housing with the electric component connected to the carbon brush through the passage.

4. An electric motor according to claim 3, wherein the cup-shaped section of the gear housing comprises a worm and a worm wheel mating with the worm and wherein, looked at from the worm wheel, the pocket for the holding device is positioned beyond the worm.

5. An electric motor according to claim 3, wherein the pocket for the holding device is closed towards other areas of the cup-shaped section of the gear housing, in particular towards areas containing gearing elements.

6. An electric motor according to claim 3, wherein adjacent the passage, a supporting rim of the cup-shaped section for the cover is continued alongside the end shield.

7. An electric motor, in particular an electric small-size motor for driving windshield wipers on motor vehicles, comprising:
   a cup-shaped motor housing;
   a gear housing closing one side of the motor housing by means of an end shield and having a cup-shaped section for receiving gearing elements;
   a cover closing the cup-shaped section of the gear housing;
   a holding device for receiving at least one associated noise-suppressing electric component, the holding device being disposed within a pocket of the cup-shaped section of the gear housing and the component being connected in an electrically conductive way with a carbon brush disposed in the motor housing, wherein a passage closed towards the outside extends from the pocket through the end shield into the motor housing with the electric component connected to the carbon brush through the passage and the holding device and a brush holder plate arranged in the motor housing are fitted on each other through the passage.

8. An electric motor according to claim 7, wherein the holding device extends through the passage as far as to the brush holder plate.

9. An electric motor according to claim 8, wherein the holding device dips through a passage in the brush holder plate by means of at least one locking leg and grips behind the brush holder plate.

10. An electric motor according to claim 3, wherein the passage is used to insert the holding device into the pocket.

11. An electric motor according to claim 3, with the holding device disposed in the pocket, the pocket being closed by the cover.

12. An electric motor according to claim 11, with the holding device fitted on the cover.

13. An electric motor according to claim 3, wherein in the passage of the end shield between the holding device and a brush holder plate arranged in the motor housing an intermediary with at least one electric conductor is positioned.

14. An electric motor according to claim 13, wherein the holding device comprises at least one plug adjacent for an electrically conductive connection with a counterplug.

15. An electric motor according to claim 14, wherein a counterplug is fitted on the cover.

16. An electric motor according to claim 14, wherein the counterplug is fitted on the intermediary.

17. An electric motor according to claim 3, wherein noise suppressors are interconnected themselves as well as noise suppressors and carbon brushes are connected with each other in an electrically conductive manner via sheet metal strips.

18. An electric motor according to claim 17, wherein are least one of the sheet metal strips form a plug.

19. An electric motor according to claim 3, wherein a sheet metal strip mounted on the holding device for electrically connecting a noise suppressor with the gear housing, in particular the cover, is pinched between the cover and cup-shaped section of the gear housing.

20. An electric motor according to claim 19, wherein said cover includes a lug, said lug being cut out from said cover, bent, and pressed onto a sheet metal strip extending into a deepening of the cup-shaped section of the gear housing.

21. An electric motor according to claim 20, wherein the cover includes a hole associated with the lug, the hole being injected-molded with plastic material.

22. An electric motor, in particular an electric small-size motor for driving windshield wipers on motor vehicles, comprising:
   a cup-shaped motor housing;
   a gear housing closing one side of the motor housing by means of an end shield and having a cup-shaped section for receiving gearing elements;
   a cover closing the cup-shaped section of the gear housing;
   a holding device for receiving at least one associated noise-suppressing electric component, the holding device comprising a first chamber for at least one noise-suppressing coil and a second chamber for at least one noise-suppressing capacitor, the holding device being disposed within a pocket of the cup-shaped section of the gear housing and component being connected in an electrically conductive way with a carbon brush disposed in the motor housing, wherein a passage closed towards the outside extends from the pocket through the end shield into the motor housing with the electric component connected to the carbon brush through the passage.

23. An electric motor according to claim 22, wherein, looked at in a direction perpendicularly to the end shield, the chambers are positioned one behind the other.

24. An electric motor according to claim 23, wherein the chamber for a noise-suppressing capacitor is farther away from the end shield than the chamber for a noise-suppressing coil.

25. An electric motor according to claim 22, wherein, in the area between the two chamber, at least one plug is provided on the holding device.

* * * * *